United States Patent [19]
Berry et al.

[11] Patent Number: 5,473,745
[45] Date of Patent: Dec. 5, 1995

[54] EXPOSING AND HIDING A TITLE BAR BEHIND ITS WINDOW USING A VISUAL CUE

[75] Inventors: Richard E. Berry, Georgetown; Jon H. Werner, Austin, both of Tex.

[73] Assignee: International Business Machines Corporation, Armonk, N.Y.

[21] Appl. No.: 355,872

[22] Filed: Dec. 14, 1994

[51] Int. Cl.[6] .................................................. G06F 3/00
[52] U.S. Cl. ........................................ 395/157; 395/159
[58] Field of Search .................................. 395/155–161, 395/152, 154, 139; 345/117–120, 122, 125, 131

[56] References Cited

U.S. PATENT DOCUMENTS

| | | | |
|---|---|---|---|
| 4,931,783 | 6/1990 | Atkinson | 345/156 |
| 5,001,697 | 3/1991 | Torres | 395/157 |
| 5,050,105 | 9/1991 | Peters | 395/161 X |
| 5,063,600 | 11/1991 | Norwood | 395/161 X |
| 5,140,678 | 8/1992 | Torres | 395/159 |
| 5,237,651 | 8/1993 | Randall | 395/155 X |
| 5,305,435 | 4/1994 | Bronson | 395/159 |
| 5,367,623 | 11/1994 | Iwai et al. | 395/157 |

OTHER PUBLICATIONS

Microsoft User's Guide vol. 2.0, Microsoft Corp., 1987, pp. 95–96.
Common User Access Advanced Interface Design Guide, IBM, Jun. 1989, pp. 21–31, 39–42, 45–46, 55–58.

Primary Examiner—Raymond J. Bayerl
Assistant Examiner—John E. Breene
Attorney, Agent, or Firm—Jeffrey S. LaBaw; Jenkens & Gilchrist

[57] ABSTRACT

A technique for the display and manipulation of windows resembling real-world objects in an object-oriented graphical user interface displays windows without visible borders, title bars, scroll bars and various graphical symbols that surround the information in conventional windows. Window components are provided to support window manipulation functions such as MOVE, SIZE and CLOSE. A slide-up title bar area with a close-box is generally kept hidden behind the window until dragged-up by the user when desired.

13 Claims, 7 Drawing Sheets

EXPOSING AND HIDING A TITLE BAR BEHIND ITS WINDOW USING A VISUAL CUE

TECHNICAL FIELD OF THE INVENTION

The present invention relates in general to data processing systems, and in particular, to a system and method for displaying windows in a data processing system.

BACKGROUND OF THE INVENTION

Current graphical user interfaces ("GUI's") utilize windows to display views of objects. Referring to FIG. 7, a window 70 is typically composed of a visible border 700, a title bar 701, and various other graphic symbols that surround the information in the window 70. These window components support window manipulation functions such as MOVE, SIZE, and CLOSE. Users can typically move a window 70 by pointing to and dragging the window's title bar 701 using a mouse; users can change a window's size by dragging a border 700 or a sizing symbol (not shown) embedded in the border 700; and users can close the window 70 by clicking on yet another symbol 702. All popular windowing user interfaces use this approach. In addition, title bar 701 serves to identify the object or program using the window 70.

This windowing technique has several significant disadvantages. First, it visually encumbers the presentation of the user's information and distracts the user's focus. Second, the window components occupy precious space on the display that could otherwise be used to display more of the user's information. And third, it creates an artificial presentation filled with computer-based artifacts that tend to disguise the user's information.

Thus, there is a need in the art for a presentation of windows resembling real-world objects in an object-oriented graphical user interface. There is a further need in the art for a windows presentation that does not waste screen space with superfluous information.

SUMMARY OF THE INVENTION

It is an objective of the present invention to display windows resembling real-world objects, and to continue to provide for typical window manipulation functions such as MOVE, SIZE and CLOSE, while also supporting an object title capability.

In an attainment of the above objective, the present invention provides a presentation of information in real-world rendering forms, such as paper forms, notebooks, address books, clocks, etc. without display of obvious window components, title bars, graphic symbols, or borders. Subtle and dynamic visual cues are provided to denote availability of window manipulation functions, including the provision of dynamically appearing mechanisms for window manipulation. Window manipulation is accomplished through the use of various gestures made using a pen or a mouse device.

In a preferred embodiment of the present invention, a shading near the upper-left corner of a borderless and titleless window provides a cue to the existence of a slide-up title area, which can be manipulated by a pointing device to display a title bar and close-box when desired. This slide-up portion can be hidden again by clicking or dragging the subtle visual cue on its border.

The borderless window can be moved by moving the mouse drag button with the pointer over whitespace within the window, or by using a mouse drag button with the pointer over the slide-up title area after the slide-up area has been brought into view.

The window can be resized using the same technique that users of typical windows are already familiar with—specifically by pointing to one of the window's edges and dragging the edge using a typical mouse drag action.

To close the window displayed by the present invention, the user can use the close-box in the slide-up area, double-click on the subtle visual cue near the upper-left corner of the window, or use a pen or a mouse-based gesture that consists of a "flick" toward the inside of the window.

In a preferred embodiment, the present invention is implemented within a data processing system comprising a processor, a storage device and input/output (I/O) device(s) including a display device.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
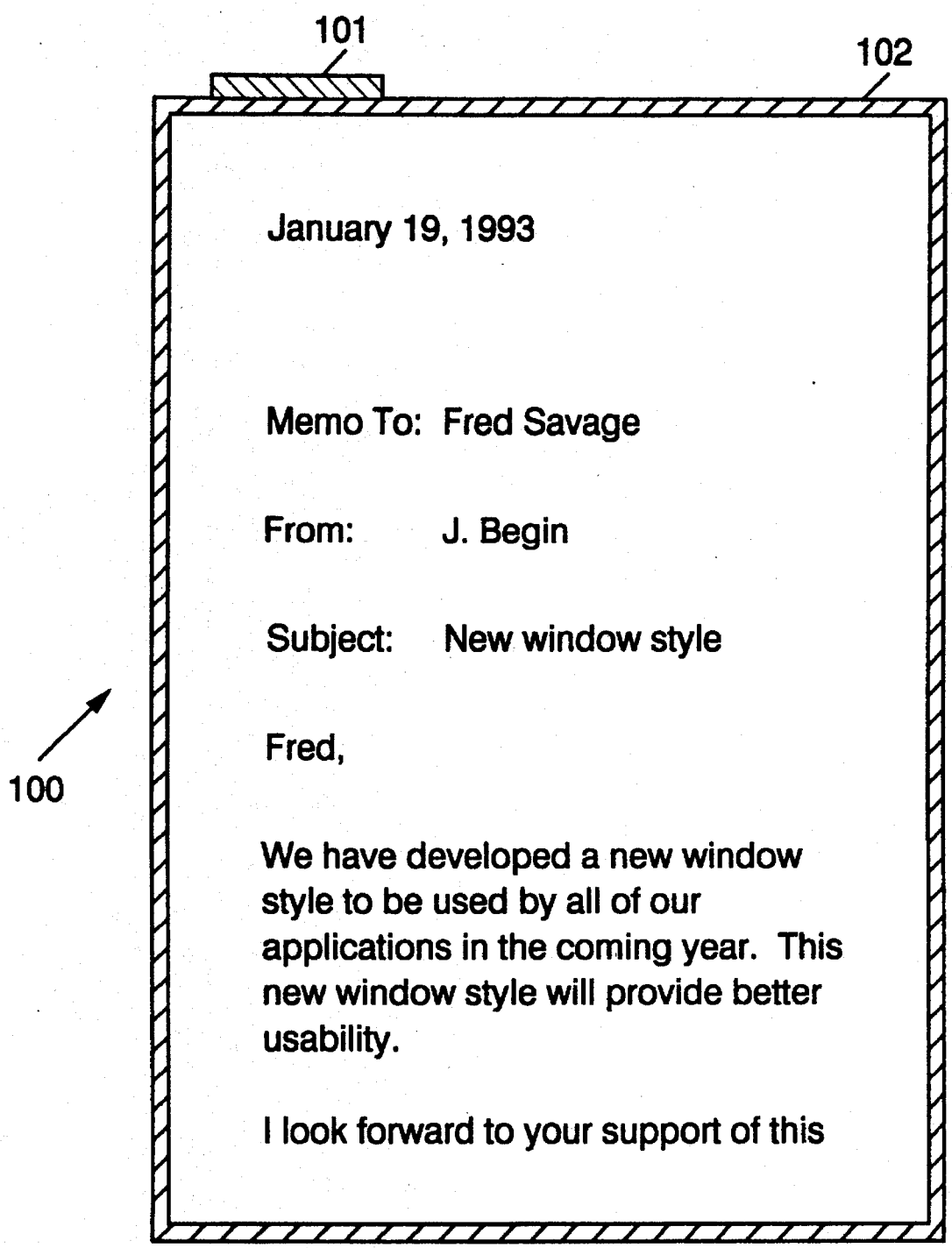
FIG. 1 illustrates a graphical user interface in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated window 100 in accordance with the present invention, wherein window 100 encloses a typical object displayed by data processing system 60 on display 38 (see FIG. 6), e.g., a word processing document. IBM OS/2 and Microsoft Windows may be utilized to implement such programming objects within a windows environment. Window 100 does not include a title bar, scroll bars, button bars or a significant border (see FIG. 7). The borderless indication of the boundary for window 100 is merely shaded portion 102. Alternatively, a mere change in color may indicate where window 100 ends and another window, or the background of the display screen, begins. In a preferred embodiment of the present invention, a visually subtle technique, such as shading 101 near the upper-left corner of window 100, provides a cue to the existence of slide-up title area 200 (see FIG. 2). Many objects can be easily identifiable by content and do not require titles, as evidenced by the lack of titles on many objects in the real world. Shape and content are vital cues to recognition in the real world and can be used to advantage in a GUI to identify the contents of windows.

Figure 2:
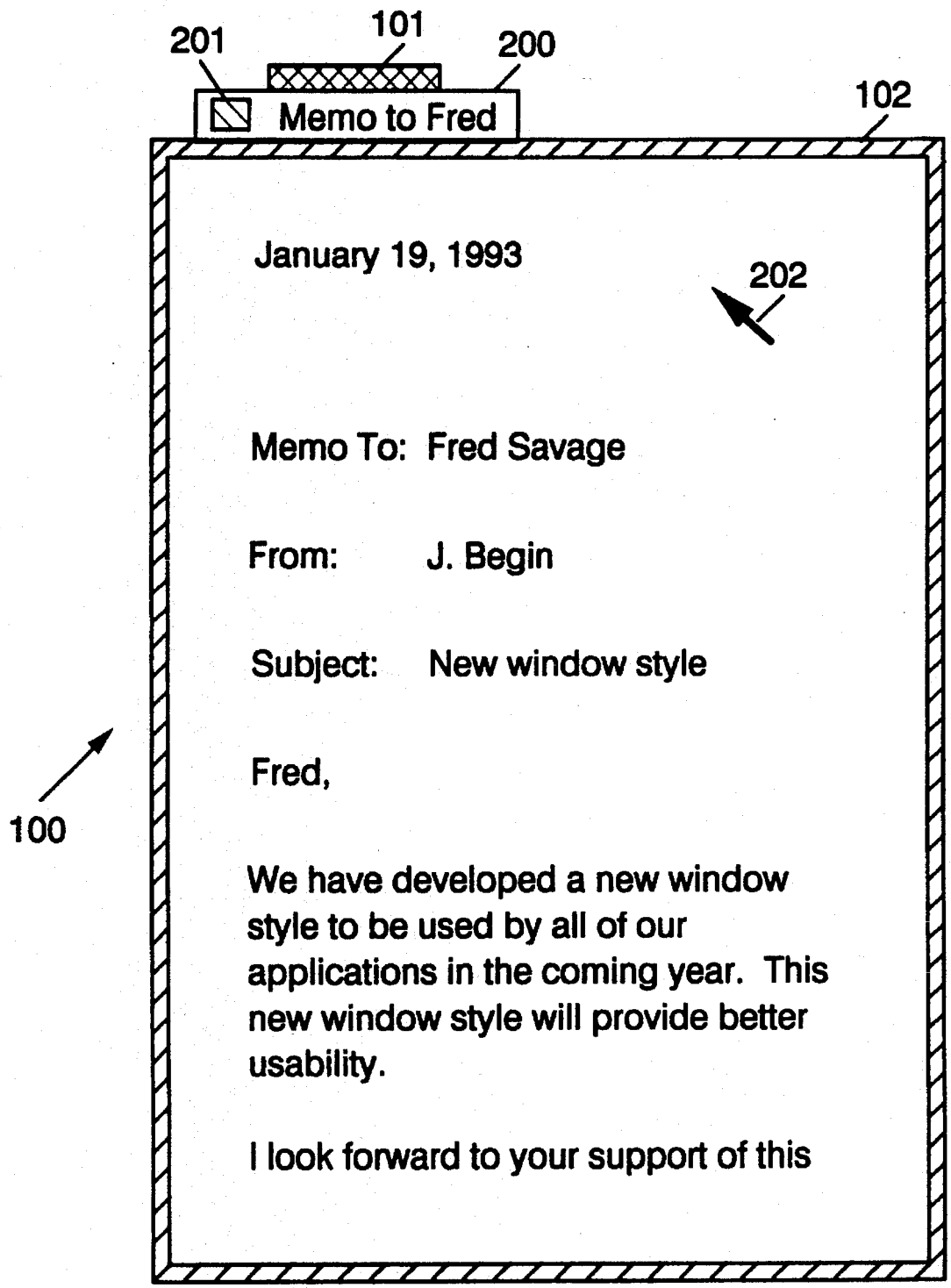
FIG. 2 illustrates exposing a hidden title bar of a window in accordance with the present invention.

Referring next to FIG. 2, there is shown window 100 displayed on display 38 after the user has activated slide-up 200, for example, by clicking a mouse button (see mouse 26) or by dragging on subtle visual cue 101 by placing mouse pointer 202 on cue 101 and pressing a mouse button and dragging cue 101 upwards. Ideally, slide-up 200 is animated such that it slides into view as though it had been "underneath" window 100. Slide-up 200 contains an object title, which may be editable by the user, and close-box 201, used to close the window in a manner similar to the way windows are closed in current GUIs. Slide-up 200 can be hidden again by clicking on slide-up 200 or dragging downward with the mouse pointer on subtle visual cue 101.

Figure 3:
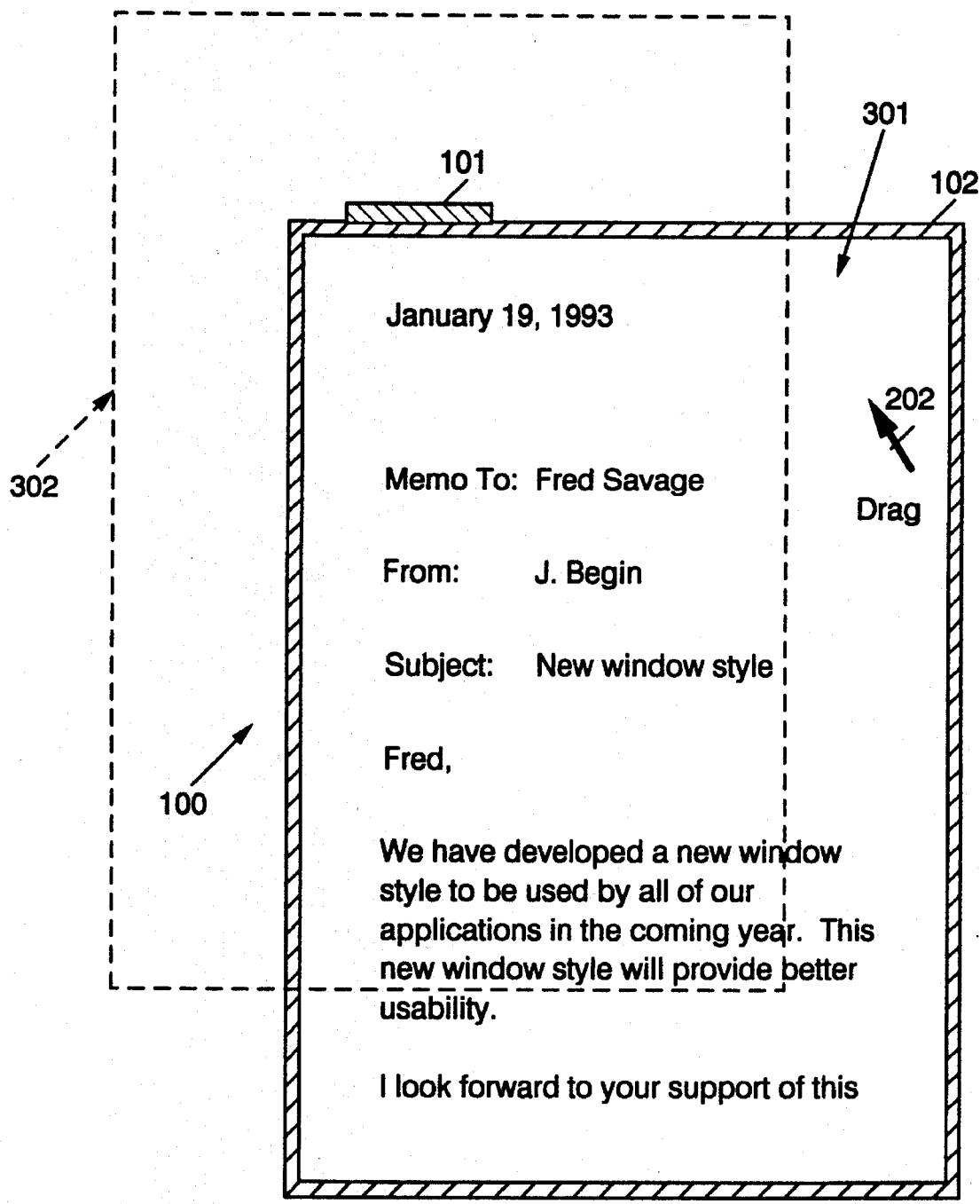
FIG. 3 illustrates performing a move action upon a window in accordance with the present invention.

Referring next to FIG. 3, there is illustrated window 100 with slide-up 200 "hidden" behind window 100. Window 100 can be moved around on the screen of display device 38 by (1) using mouse pointer 202 over whitespace 301 within window 100 and pressing the mouse button in a click and drag function, which effectively moves the entire window 100 to a desired location within display 38, as indicated by dashed line 302, or (2) using the mouse drag button with pointer 202 over slide-up 200 after slide-up 200 has been brought into view, as previously described with respect to FIG. 2. "Whitespace" refers to those portions of window 100 that do not contain either a title bar, a scroll bar, a close-box, a border, or displayed data associated with a programmed object enclosed by window 100. If no whitespace 301 exists within window 100, or whitespace 301 is not visually obvious, a mouse override technique may be employed, such as holding down the ALT key on keyboard 24 along with using the mouse drag button. This technique provides an override to distinguish moving window 100 versus the contents of window 100 when window 100 contains moveable objects.

Figure 4:
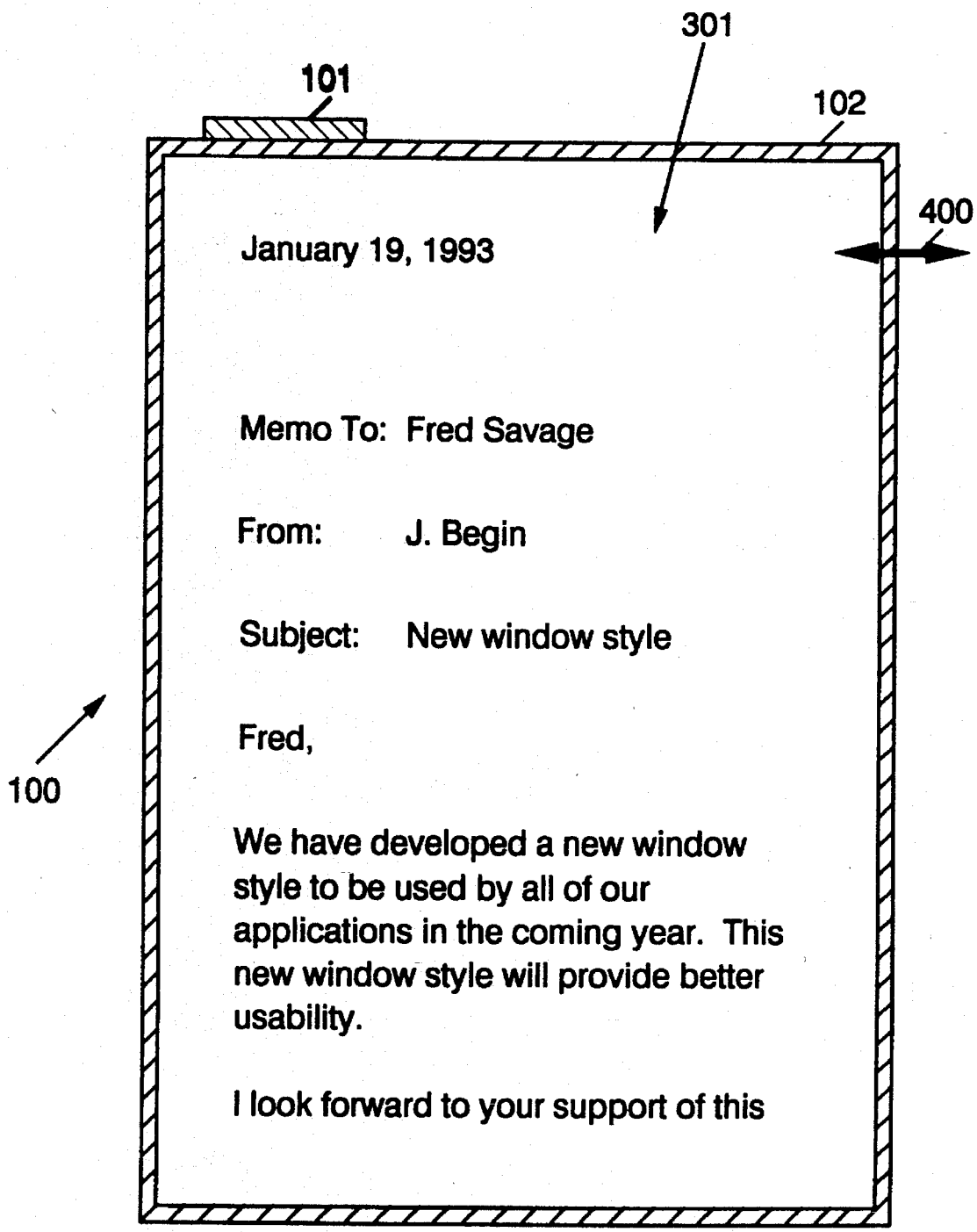
FIG. 4 illustrates sizing of a window in accordance with the present invention.

Referring next to FIG. 4, window 100 can be resized using a similar technique utilized by users of OS/2, Motif, and Microsoft Windows—specifically, by pointing to shaded portion 102 of window 100 and dragging shaded portion 102 using the mouse drag button. The mouse pointer changes appearance to double-headed arrow 400 when it is over shading 102 to indicate availability of the sizing action.

Figure 5:
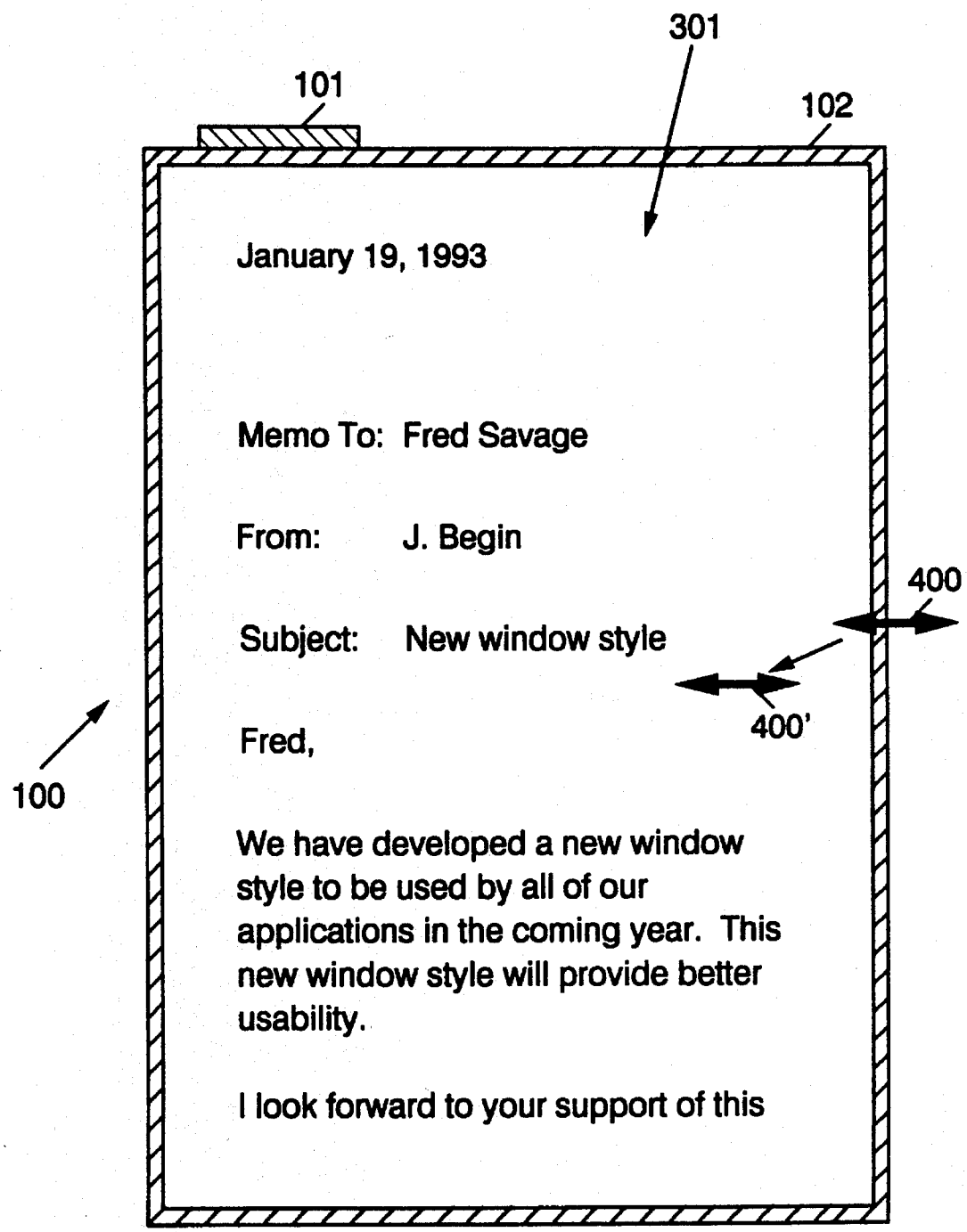
FIG. 5 illustrates a closing action of a window in accordance with the present invention.

Referring next to FIG. 5, to close window 100, the user can (1) use close box 201 in slide-up 200 in a conventional manner, (2) double-click on subtle visual cue 101 near the upper-left corner of window 100, or (3) use a pen or mouse-based gesture that begins within subtle shaded area 102 used for sizing window 100. Thus, the user will place the mouse pointer over towards shaded portion 102 of window 100 until double-headed arrow 400 is obtained over shaded portion 102. The user then uses the pen device (not shown) or mouse 26 to perform a "flicking" gesture toward the inside of window 100. When using mouse 26, the gesture may consist of pressing the mouse SELECT button, moving some minimum distance toward the inside of window 100, resulting in movement of double-headed arrow 400 to position 400', and releasing the mouse button.

The foregoing techniques for the presentation and manipulation of windows will allow future GUI's to represent objects with much more realism. Users will find it easier to recognize and understand the intended use of objects, more space will be provided for the display of the user's information, and visual distractions introduced by the computer-based manipulation mechanisms will be greatly reduced.

Figure 6:
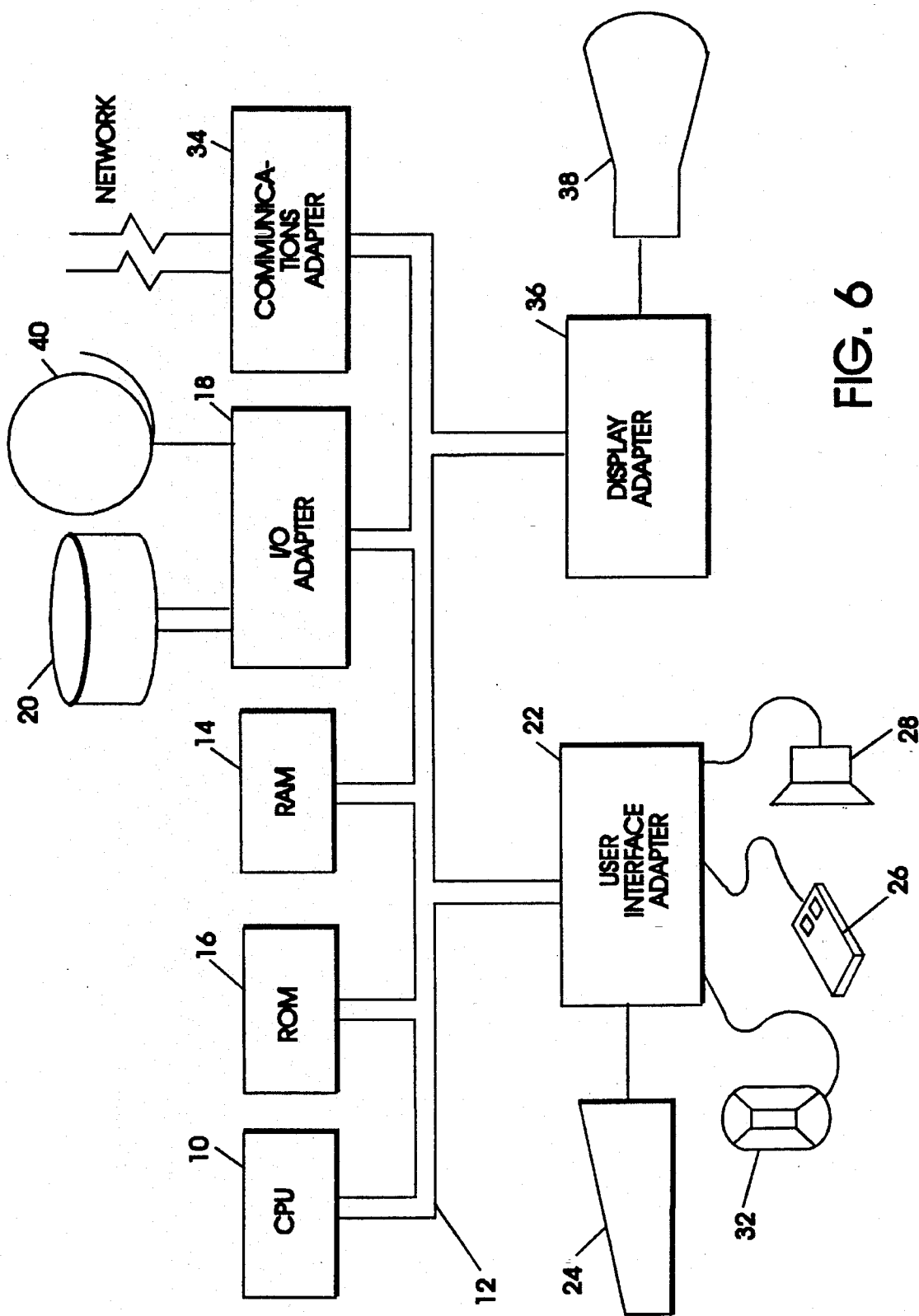
FIG. 6 illustrates a data processing system configurable for embodying the present invention.
Figure 7:
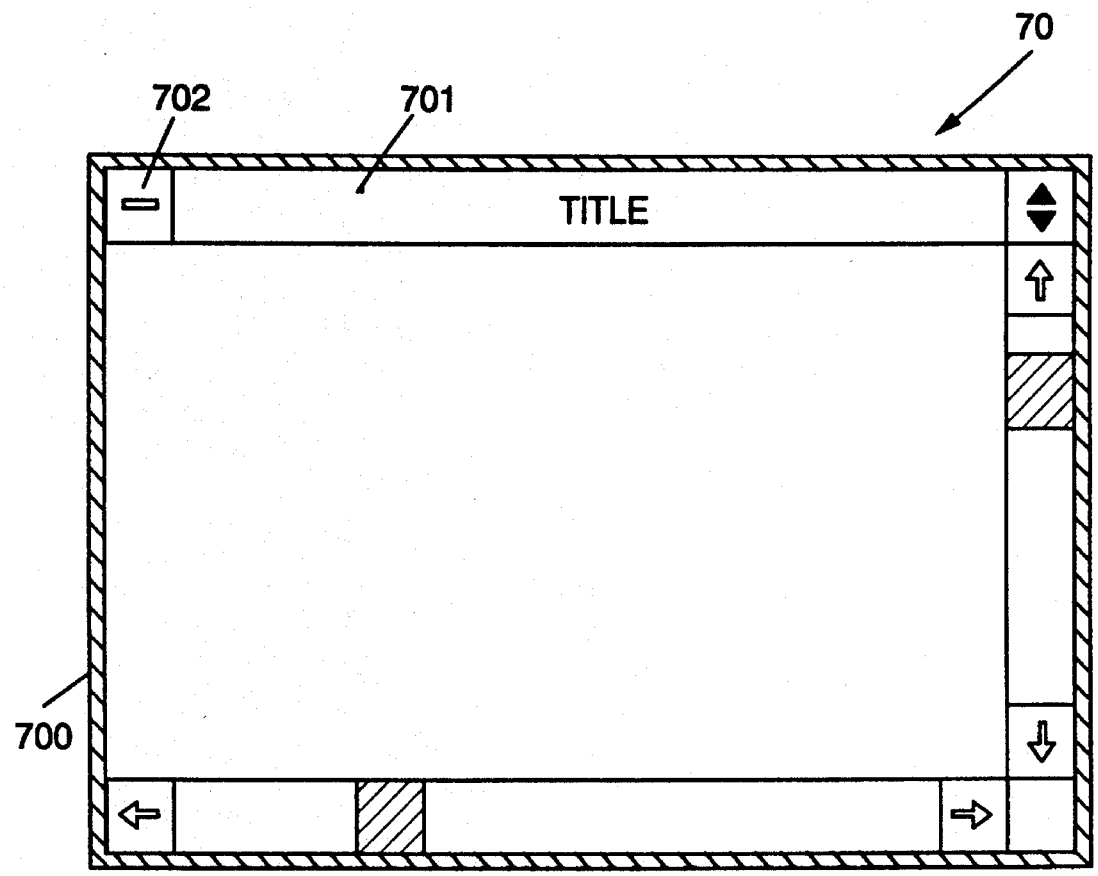
FIG. 7 illustrates a prior art window.

A representative hardware environment for practicing the present invention is depicted in FIG. 6, which illustrates a typical hardware configuration of a workstation in accordance with the subject invention having central processing unit 10, such as a conventional microprocessor, and a number of other units interconnected via system bus 12. The workstation shown in FIG. 6 includes random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

The present invention is represented by the following pseudocode, which may be configured for storage within disk storage 20, tape storage 40, or RAM 14, and implemented within CPU 10 to perform the method of the present invention:

WINDOW MANAGEMENT while waiting for window events
  if new window is to be mapped and decorated then
    get window title from application
    create title bar with title stiring and close box
    render border around window extents
    register callback function A1 for slide-up control
    register callback function A2 for resize/move control
    register callback function A3 for close on pointer gesture
  end if
end while

POSTING THE SLIDE-UP TITLE BAR VIA CLICKING OR DRAGGING

A1 callback function
  if slide-up control is not visible then
    animate title bar rendering sequence to display title bar window from behind main window in a slide-up fashion
    register callback function A3 on close icon selection
  else slide-up control is visible
    animate title bar rendering sequence to hide title bar window behind main window in a slide-down fashion

```
end if
end callback
```

RESPONDING TO A WINDOW RESIZE/MOVE REQUEST

```
A2 callback function
    if mouse down in resize area of border then
        while mouse down show rubberband effect of new
            window size
        end while
        notify window of new size
    else if mouse down and in title bar or in whitespace of
        window or in window with augmented keys then
        while mouse down show rubberband effect of new
            window location
        end while
        notify window of new location
    end if
end callback
```

RESPONDING TO A WINDOW CLOSE REQUEST

```
A3 callback function
    if close icon selected then
        notify window that the user has chosen to close
    else if mouse down in window border then
        if delta movement of mouse is towards center of
            window at a user defined threshold of speed and
            mouse up event occurs then
            notify window that the user has chosen to close
        end if
end callback
```

Although the present invention and its advantages have been described in detail, it should be understood that various changes, substitutions and alterations can be made herein without departing from the spirit and scope of the invention as defined by the appended claims.

What is claimed is:

1. A method for displaying a graphical user interface on a display device coupled to a data processing system, said method comprising the steps of:

displaying a window on said display device coupled to said data processing system, said window operable for enclosing a programmed object displayed on said display device coupled to said data processing system;

displaying a visual cue on said display device coupled to said data processing system, said visual cue accompanying said window displayed on said display device, said visual cue operable for displaying on said display device a previously hidden title bar associated with said window on said display device;

exposing said previously hidden title bar in response to a received input comprising dragging action on said visual cue with an input device coupled to said data processing system; and hiding said exposed title bar behind said window in response to a received input comprising dragging on said visual cue with said input device coupled to said data processing system.

2. The method as recited in claim 1, wherein said visual cue is a shaded region near an edge of said window displayed on said display device coupled to said data processing system.

3. The method as recited in claim 1, further comprising the step of displaying on said display device a close-box in said title bar.

4. The method as recited in claim 1, wherein said input device is a mouse and said received input comprising a dragging action on said visual cue with an input device coupled to said data processing system comprises placing a displayed pointer over said visual cue to drag said previously hidden title bar from behind said window displayed on said display device.

5. The method as recited in claim 1, wherein said received input comprising a dragging action on said visual cue with an input device coupled to said data processing system further comprises activating a cursor control device.

6. The method as recited in claim 1, wherein said title bar is editable.

7. The method as recited in claim 1, further comprising the step of resizing said window in response to a received input comprising a positioning of an input device pointer over a shaded portion adjacent an edge of said window and using said pointer to move said edge of said window.

8. A data processing computer comprising a processor, a memory device, and an input device couple via a bus to a display device, said data processing computer further comprising:

means for displaying a window on said display device coupled to said data processing computer; and means for displaying a visual cue on said display device coupled to said data processing computer, said displayed visual cue associated with said displayed window, said displayed visual cue operable for displaying a previously hidden title bar on said display device coupled to said data processing computer;

wherein said displaying means is operable in response to a received input comprising a dragging action on said visual cue with a cursor control device coupled to said data processing computer, said dragging action operating to drag said hidden title bar from behind said window.

9. The computer as recited in claim 8, wherein said visual cue is a shaded region near an edge of said window displayed on said display device coupled to said data processing computer.

10. The computer as recited in claim 8, wherein said title bar is editable and includes a close-box displayed on said display device coupled to said data processing computer.

11. The computer as recited in claim 8, further comprising:

means operable for repositioning said window upon receipt of an input comprising a placement of a mouse pointer over a whitespace within said window and a dragging of said mouse pointer to a new position on a screen of said display device.

12. The computer as recited in claim 8, further comprising:

means operable for repositioning said window upon receipt of an input comprising a placement of a mouse pointer over said visual cue and a dragging of said mouse pointer to a new position on a screen of said display device.

13. The computer as recited in claim 8, further comprising:

means for displaying said title bar upon receipt of an input directed at said visual cue.

* * * * *

UNITED STATES PATENT AND TRADEMARK OFFICE
CERTIFICATE OF CORRECTION

PATENT NO. : 5,473,745

DATED : December 5, 1995

INVENTOR(S) : Richard E. Berry et al.

It is certified that error appears in the above-indentified patent and that said Letters Patent is hereby corrected as shown below:

Column 4, line 46   Replace "stiring"
With --string--

Signed and Sealed this

First Day of July, 1997

Attest:

BRUCE LEHMAN

Attesting Officer   Commissioner of Patents and Trademarks